US 9,891,868 B2

(12) United States Patent
Ishii et al.

(10) Patent No.: US 9,891,868 B2
(45) Date of Patent: Feb. 13, 2018

(54) CHARGING PROCESSING SYSTEM, CHARGING PROCESSING METHOD, AND RECORDING MEDIUM

(71) Applicants: Yukinori Ishii, Kanagawa (JP); Makoto Sasaki, Kanagawa (JP); Junki Aoki, Kanagawa (JP); Takuya Mori, Tokyo (JP); Itaru Kodaira, Kanagawa (JP); Hiroaki Ikkanzaka, Tokyo (JP); Tomohiro Kuroyanagi, Tokyo (JP); Fumiyoshi Kittaka, Kanagawa (JP); Koichiro Maemura, Kanagawa (JP)

(72) Inventors: Yukinori Ishii, Kanagawa (JP); Makoto Sasaki, Kanagawa (JP); Junki Aoki, Kanagawa (JP); Takuya Mori, Tokyo (JP); Itaru Kodaira, Kanagawa (JP); Hiroaki Ikkanzaka, Tokyo (JP); Tomohiro Kuroyanagi, Tokyo (JP); Fumiyoshi Kittaka, Kanagawa (JP); Koichiro Maemura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/209,147

(22) Filed: Jul. 13, 2016

(65) Prior Publication Data
US 2017/0017442 A1    Jan. 19, 2017

(30) Foreign Application Priority Data
Jul. 17, 2015    (JP) .................................. 2015-143148

(51) Int. Cl.
*G06F 3/12*    (2006.01)
*G03G 15/00*    (2006.01)
*G06Q 30/02*    (2012.01)

(52) U.S. Cl.
CPC ....... *G06F 3/1206* (2013.01); *G03G 15/5083* (2013.01); *G06F 3/1261* (2013.01);
(Continued)

(58) Field of Classification Search
USPC ........................................................ 358/1.13
See application file for complete search history.

(56) References Cited

U.S. PATENT DOCUMENTS

2008/0174819 A1*  7/2008  Hada .................. G03G 15/5004
                                                  358/1.15
2011/0261399 A1   10/2011  Hattori et al.
(Continued)

FOREIGN PATENT DOCUMENTS

JP    2002-298027    10/2002

OTHER PUBLICATIONS

Masazaki Toshiya, Image Processing Apparatus Accounting Management System Accounting Management Method and Recording Medium, Feb. 4, 2010, Machine Translated Japanese Patent Application Publication, JP2010073016, all pages.*

*Primary Examiner* — Ngon Nguyen
(74) *Attorney, Agent, or Firm* — Harness, Dickey & Pierce, P.L.C.

(57)    ABSTRACT

A charging processing system includes: a receiving unit configured to receive a request to execute a first function which a first device has, from a second device that does not have the first function; a function executing unit configured to execute the first function; and a charging processing unit configured to perform charging processing such that an amount of charge for execution of the first function is larger as there is a larger difference between a performance with regard to the first function and a performance of the second device or a performance with regard to a second function
(Continued)

which has a lower performance than the first function and which the second device does not have.

13 Claims, 14 Drawing Sheets

(52) U.S. Cl.
CPC ....... *G06F 3/1285* (2013.01); *G06Q 30/0283* (2013.01); *G03G 2215/00109* (2013.01); *G06F 3/1291* (2013.01)

(56) References Cited

U.S. PATENT DOCUMENTS

| | | | |
|---|---|---|---|
| 2012/0013931 A1* | 1/2012 | Tsujimoto | H04N 1/00204 358/1.13 |
| 2012/0023451 A1 | 1/2012 | Kuroyanagi | |
| 2012/0212761 A1 | 8/2012 | Kuroyanagi | |
| 2013/0027736 A1 | 1/2013 | Kittaka | |
| 2013/0057918 A1* | 3/2013 | Ohta | G03G 21/02 358/1.15 |
| 2014/0160530 A1 | 6/2014 | Kittaka | |
| 2014/0204416 A1 | 7/2014 | Kuroyanagi | |
| 2014/0211257 A1 | 7/2014 | Ishii | |
| 2014/0362407 A1 | 12/2014 | Sasaki et al. | |
| 2015/0109638 A1 | 4/2015 | Sasaki | |
| 2015/0146233 A1 | 5/2015 | Ikkanzaka | |
| 2015/0156348 A1 | 6/2015 | Kittaka et al. | |
| 2015/0172485 A1 | 6/2015 | Ikkanzaka | |
| 2015/0264197 A1 | 9/2015 | Sato et al. | |
| 2015/0271353 A1 | 9/2015 | Nishimura et al. | |
| 2015/0286445 A1 | 10/2015 | Kittaka | |
| 2016/0080200 A1 | 3/2016 | Ishii et al. | |
| 2016/0080588 A1 | 3/2016 | Sasaki et al. | |
| 2016/0277630 A1* | 9/2016 | Mori | H04N 1/344 |

* cited by examiner

|  | FUNCTION X | FUNCTION Y | FUNCTION Z |
|---|---|---|---|
| MAIN BODY UNIT | SUPPORTED | SUPPORTED | SUPPORTED |
| SERVER UNIT | SUPPORTED | SUPPORTED | NOT SUPPORTED |
| CHILD DEVICE 1 | NOT SUPPORTED | SUPPORTED | SUPPORTED |
| CHILD DEVICE 2 | NOT SUPPORTED | NOT SUPPORTED | SUPPORTED |

FIG.6

| FUNCTION IDENTIFICATION INFORMATION | REQUIRED-PERFORMANCE INFORMATION |
|---|---|
| FUNCTION X | 3 |
| FUNCTION Y | 2 |
| FUNCTION Z | 1 |

FIG.7

| MODEL IDENTIFICATION INFORMATION | MODEL PERFORMANCE INFORMATION |
|---|---|
| MODEL A | 3 |
| MODEL B | 2 |
| MODEL C | 1 |

| | | FUNCTION IDENTIFICATION INFORMATION | | |
|---|---|---|---|---|
| | | FUNCTION X | FUNCTION Y | FUNCTION Z |
| DEVICE IDENTIFICATION INFORMATION | MAIN BODY UNIT | - | - | - |
| | CHILD DEVICE 1 | 2015/1/10 | - | - |
| | CHILD DEVICE 2 | 2015/1/10 | 2015/1/10 | - |

| FUNCTION IDENTIFICATION INFORMATION | FUNCTIONAL PERFORMANCE INFORMATION |
|---|---|
| FUNCTION X | 3 |
| FUNCTION Y | 2 |
| FUNCTION Z | 1 |

|  |  | FUNCTION IDENTIFICATION INFORMATION | | |
|---|---|---|---|---|
|  |  | FUNCTION X | FUNCTION Y | FUNCTION Z |
| MODEL IDENTIFICATION INFORMATION | MODEL A | SUPPRTED | SUPPRTED | SUPPRTED |
|  | MODEL B | NOT SUPPRTED | SUPPRTED | SUPPRTED |
|  | MODEL C | NOT SUPPRTED | NOT SUPPRTED | SUPPRTED |

CHARGING PROCESSING SYSTEM, CHARGING PROCESSING METHOD, AND RECORDING MEDIUM

CROSS-REFERENCE TO RELATED APPLICATIONS

The present application claims priority under 35 U.S.C. §119 to Japanese Patent Application No. 2015-143148, filed Jul. 17, 2015. The contents of which are incorporated herein by reference in their entirety.

BACKGROUND OF THE INVENTION

1. Field of the Invention

The present invention relates to a charging processing system, a charging processing method, and a recording medium.

2. Description of the Related Art

There are conventionally-known technologies for conducting charging processing for provision of contents or services (for example, see Japanese Unexamined Patent Application Publication No. 2002-298027).

Furthermore, in recent years, when multiple devices which have a difference in functionality, are introduced into the consumer's environment, a cooperative function where a device without a differential function cooperates with a device or a server with the differential function so that even the device without the differential function becomes able to use the differential function, may be introduced.

However, conventionally, there is only a method with regard to the use of a differential function, where the used amount is counted and charging is conducted in accordance with the number of times of use; therefore, charging processing for the use of a cooperative function was not possible. There is a demand for charging processing with regard to the use of the above-described cooperative function; however, as the value of a differential function which becomes usable with a cooperative function, changes due to various factors, it is not preferable that charging processing is performed in a single uniform way with regard to the use of the cooperative function.

SUMMARY OF THE INVENTION

According to one aspect of the present invention, a charging processing system includes a receiving unit, a function executing unit and a charging processing unit. The receiving unit is configured to receive a request to execute a first function which a first device has, from a second device that does not have the first function. The function executing unit is configured to execute the first function. The charging processing unit is configured to perform charging processing such that an amount of charge for execution of the first function is larger as there is a larger difference between a performance with regard to the first function and a performance of the second device or a performance with regard to a second function which has a lower performance than the first function and which the second device does not have.

BRIEF DESCRIPTION OF THE DRAWINGS

FIG. 6 is a diagram that illustrates an example of the performance providing information according to the first embodiment;

FIG. 7 is a diagram that illustrates an example of the model performance information according to the first embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
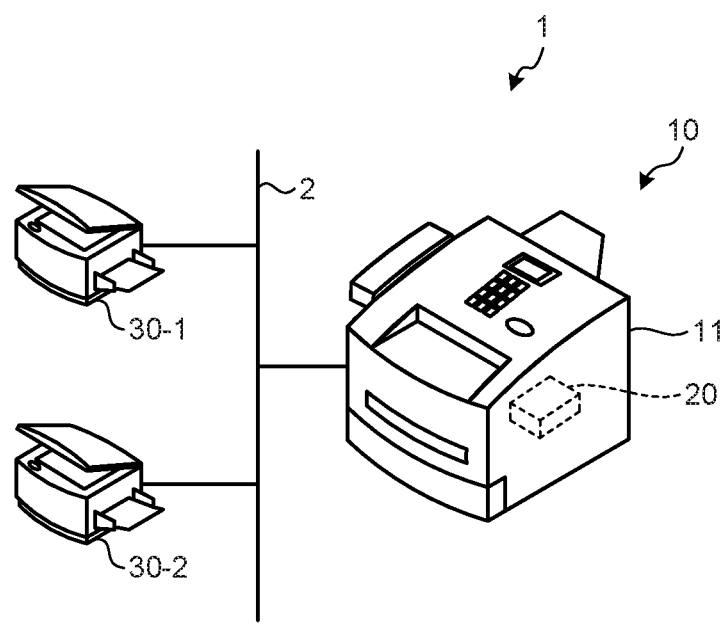
FIG. 1 is a schematic diagram that illustrates an example of a charging processing system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to the attached drawings, a detailed explanation is given below of an embodiment of a charging processing system, a charging processing method, and a recording medium according to the present invention.

An embodiment has an object to provide a charging processing system, a charging processing method, and a recording medium that enable charging processing to be performed with regard to the use of a cooperative function in accordance with the relationship between a device and a differential function which is used with the device, or the like.

First Embodiment

FIG. 1 is a schematic diagram that illustrates an example of a charging processing system 1 according to a first embodiment. As illustrated in FIG. 1, the charging processing system 1 includes a parent device 10 and child devices 30-1 to 30-2 (an example of a second device). The parent device 10 and the child devices 30-1 to 30-2 are connected via a network 2. Examples of the network 2 include a local area network (LAN) or the Internet.

In the following explanations, if the child devices 30-1 to 30-2 do not need to be distinguished from each other, the child devices may be simply referred to as a child device 30. Furthermore, FIG. 1 illustrates a case where the number of the child devices 30 is 2, which is however not a limitation, and the number of the child devices 30 may be any number as long as the number of the child devices 30 is equal to or more than 1.

The child device 30 may be, but is not limited to, an image forming apparatus, such as a printing device, copier, multifunction peripheral (MFP), scanner device, or facsimile machine; and the child device 30 may be a device other than the image forming apparatus, e.g., a projector or a camera. In the first embodiment, an explanation is given using, for example, a case where the child device 30 is a multifunction peripheral, which is however not a limitation.

The parent device 10 may be, but is not limited to, an image forming apparatuses, such as a printing device, copier, multifunction peripheral, scanner device, or facsimile machine; and the parent device 10 may be a device other than the image forming apparatuses, e.g., a projector or a camera. In the first embodiment, an explanation is given using, for example, a case where the parent device 10 is a multifunction peripheral, which is however not a limitation.

According to the first embodiment, the parent device 10 includes a main body unit 11 (an example of a first device) and a server unit 20 (an example of an information processing apparatus). The configuration of the parent device 10 as an image forming apparatus is included in the main body unit 11, and an operation of the parent device 10 as an image forming apparatus is performed by the main body unit 11. Furthermore, according to the first embodiment, it is assumed that, among the main body unit 11 and the child devices 30-1 to 30-2, the main body unit 11 is the latest model and the main body unit 11 is capable of performing even the function that the child device 30-1 or the child device 30-2 does not have. Hereafter, the function that the main body unit 11 has but the child device 30 does not have is referred to as the differential function.

Furthermore, according to the first embodiment, it is assumed that the server unit 20 is a board-like small-sized server and is incorporated in the parent device 10 so that the server unit 20 is internally connected to the main body unit 11, which is however not a limitation. It is enough that the server unit 20 is connected to the main body unit 11, and the server unit 20 may be internally connected to the main body unit 11 or may be externally connected to the main body unit 11.

The server unit 20 has a differential function, and has a cooperative function to conduct image formation through cooperation between the differential function and the function that the child device 30 has. Therefore, according to the present embodiment, even the child device 30 is capable of forming images with the same function as the function of the main body unit 11 using the cooperative function of the server unit 20.

Figure 2:
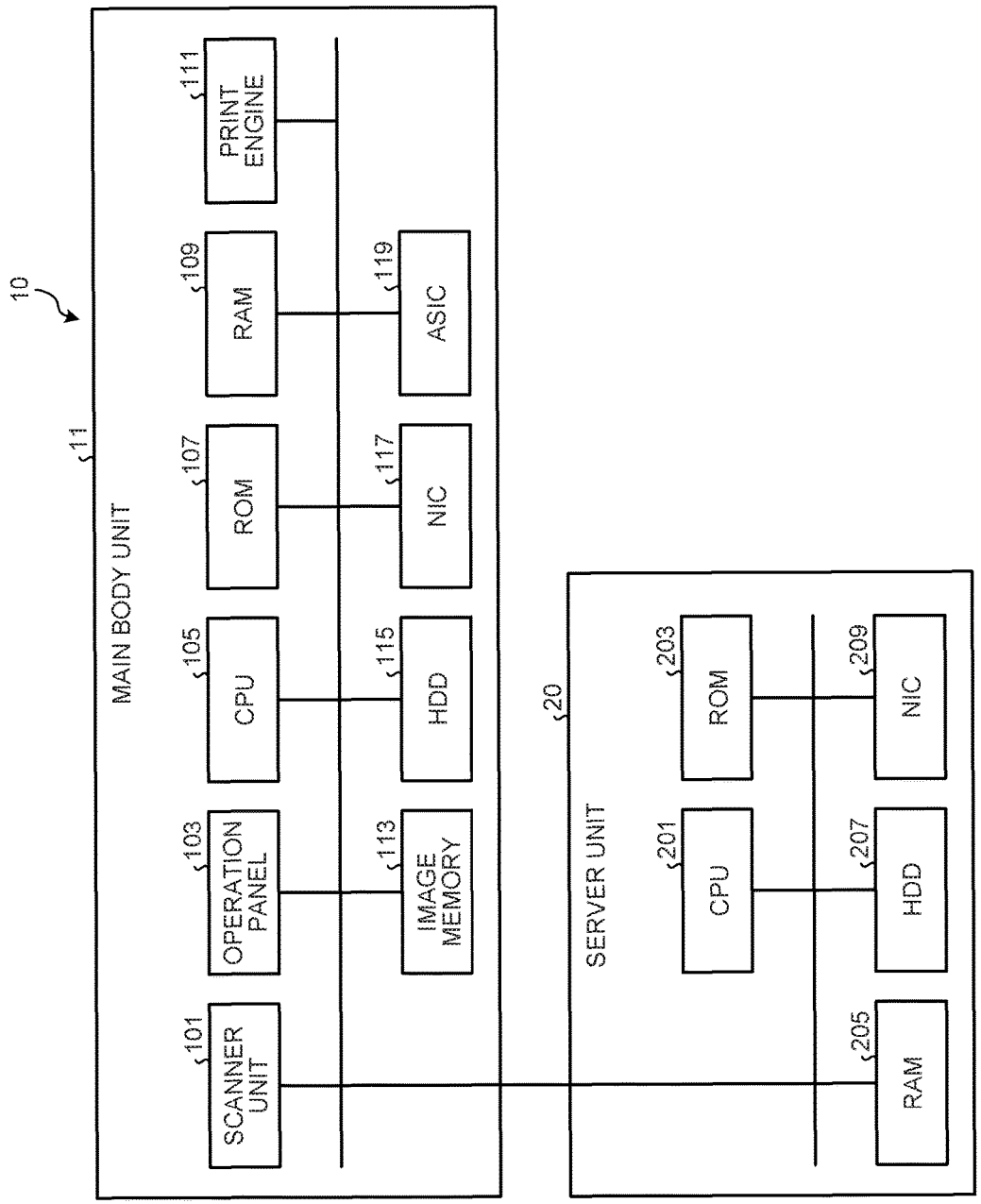
FIG. 2 is a block diagram that illustrates an example of the hardware configuration of a parent device according to the first embodiment.

FIG. 2 is a block diagram that illustrates an example of the hardware configuration of the parent device 10 according to the first embodiment. As illustrated in FIG. 2, the main body unit 11 and the server unit 20 are connected to each other via a bus in the parent device 10. The main body unit 11 includes a scanner unit 101, an operation panel 103, a central processing unit (CPU) 105, a read only memory (ROM) 107, a random access memory (RAM) 109, a print engine 111, an image memory 113, a hard disk drive (HDD) 115, a network interface controller (NIC) 117, and an application specific integrated circuit (ASIC) 119. Furthermore, the server unit 20 includes a CPU 201, a ROM 203, a RAM 205, an HDD 207, and an NIC 209. However, the hardware configuration of the parent device 10, illustrated in FIG. 2, is an example, and is not a limitation.

The scanner unit 101 electronically reads a document that is placed on the platen and generates image data. The print engine 111 prints out image data. The ASIC 119 performs various types of image processing on the image data read by the scanner unit 101, and performs various types of image processing on the image data printed out by the print engine 111. The image memory 113 is a memory that stores image data that is read by the scanner unit 101 or image data that is printed out by the print engine 111.

The NIC 117 is a communication interface for communications via the network 2. The operation panel 103 includes a liquid crystal display (LCD) for displaying screens, a light emitting diode (LED) for indicating the state, a buzzer, a hardware key, and a touch panel, and the operation panel 103 displays various types of information on the LCD or receives inputs of various types of information from the hardware key or the touch panel.

The ROM 107 stores programs to be executed by the CPU 105, and the like. The RAM 109 is used as a work area of the CPU 105. The HDD 115 stores various types of data which is used by the CPU 105, and the HDD 115 stores image data that is read by the scanner unit 101 and is subjected to various types of image processing by the ASIC 119. The CPU 105 executes programs stored in the ROM 107, on the RAM 109, thereby controlling the scanner unit 101, the operation panel 103, the print engine 111, the image memory 113, the HDD 115, the NIC 117, the ASIC 119, and the like, which are connected via the bus. Furthermore, the CPU 105 is also capable of performing various types of image processing on the image data, read by the scanner unit

101, and performing various types of image processing on the image data to be printed out by the print engine 111.

The NIC 209 is a communication interface for communications via the network 2. The ROM 203 stores programs to be executed by the CPU 201, and the like. The RAM 205 is used as a work area of the CPU 201. The HDD 207 stores various types of data that is used by the CPU 201. The CPU 201 executes programs stored in the ROM 203, on the RAM 205, thereby implementing the cooperative function.

Figures 3, 4:
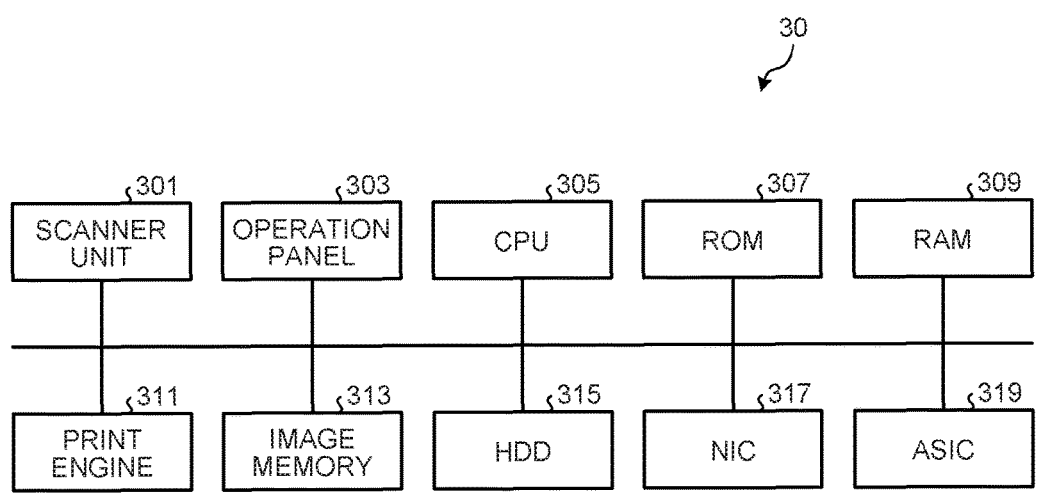
FIG. 3 is a block diagram that illustrates an example of the hardware configuration of a child device according to the first embodiment.
FIG. 4 is an explanatory diagram of an example of functions that devices in the charging processing system according to the first embodiment have.

FIG. 3 is a block diagram that illustrates an example of the hardware configuration of the child device 30 according to the first embodiment. As illustrated in FIG. 3, the child device 30 includes a scanner unit 301, an operation panel 303, a CPU 305, a ROM 307, a RAM 309, a print engine 311, an image memory 313, an HDD 315, an NIC 317, and an ASIC 319. However, the hardware configuration of the child device 30, illustrated in FIG. 3, is an example, and is not a limitation.

The scanner unit 301 electronically reads a document that is placed on the platen and generates image data. The print engine 311 prints out image data. The ASIC 319 performs various types of image processing on the image data read by the scanner unit 301, and performs various types of image processing on the image data to be printed out by the print engine 311. The image memory 313 is a memory that stores image data that is read by the scanner unit 301 and image data that is to be printed out by the print engine 311.

The NIC 317 is a communication interface for communications via the network 2. The operation panel 303 includes an LCD for displaying screens, an LED for indicating the state, a buzzer, a hardware key, and a touch panel, and the operation panel 303 displays various types of information on the LCD or receives inputs of various types of information from the hardware key or the touch panel.

The ROM 307 stores programs to be executed by the CPU 305, and the like. The RAM 309 is used as a work area of the CPU 305. The HDD 315 stores various types of data which is used by the CPU 305, and stores image data that is read by the scanner unit 301 and is subjected to various types of image processing by the ASIC 319. The CPU 305 executes programs stored in the ROM 307, on the RAM 309, thereby controlling the scanner unit 301, the operation panel 303, the print engine 311, the image memory 313, the HDD 315, the NIC 317, the ASIC 319, and the like, which are connected via the bus. Furthermore, the CPU 305 is also capable of performing various types of image processing on the image data read by the scanner unit 301, and performing various types of image processing on the image data to be printed out by the print engine 311.

Furthermore, an explanation is given below of an example where, when a scanner operation is performed by the child device 30 to read a document and generate image data, a differential function is implemented using the server unit 20 so that the scanner operation is conducted. Specifically, an explanation is given of an example where a scanner operation is performed through cooperation between the read function or various image processing functions that the child device 30 has, and the differential function that is provided by the server unit 20, which is however not a limitation. The present invention is also applicable to any image forming operation, such as a print operation, a copy operation, or a facsimile transmitting/receiving operation, through cooperation between the function that the child device 30 has and the differential function that is provided by the server unit 20.

FIG. 4 is an explanatory diagram of an example of functions that devices in the charging processing system 1 according to the first embodiment have. In the example illustrated in FIG. 4, the main body unit 11 has all functions X, Y, and Z, the server unit 20 has the functions X and Y, the child device 30-1 has the functions Y and Z, and the child device 30-2 has the function Z. It is noted, in FIG. 4, a child device 1 indicates the child device 30-1, and a child device 2 indicates the child device 30-2.

Here, in the example illustrated in FIG. 4, it is assumed that, among the main body unit 11 and the child devices 30-1 to 30-2, the main body unit 11 is the model with the highest performance, the child device 30-1 is the model with the second highest performance, and the child device 30-2 is the model with the lowest performance. The performance is the specification of the main body unit 11 and the child devices 30, and includes, but is not limited to, the processing capability of the CPU, the memory capacity of the RAM, or the memory capacity of the HDD.

Furthermore, it is assumed that, among the functions X, Y, and Z, the function X is a function whose required performance which is required for execution, is the highest, the function Y is a function whose required performance is the second highest, and the function Z is a function whose required performance is the lowest. The required performance is the performance that to an operating subject (the main body unit 11, the child device 30, or the like) of a function is required (needs) to execute the function, and is the specification as the performance of the model as described above.

Specifically, as the main body unit 11 is the model with the highest performance, the main body unit 11 has all the functions X, Y, and Z, as the child device 30-1 is the model with the second highest performance, the child device 30-1 has the functions Y and Z except for the function X that has the highest required performance, and as the child device 30-2 is the model with the lowest performance, the child device 30-2 has the function Z except for the function X that has the highest required performance and the function Y that has the second highest required performance.

However, in the example illustrated in FIG. 4, as the server unit 20 provides the differential functions X and Y, the child devices 30-1 to 30-2 can perform all the functions X, Y, and Z, and can form an image using the same functions as the main body unit 11, using the server unit 20.

Here, the functions X, Y, and Z may be any functions as long as the functions X, Y, and Z are used during an image forming operation. Examples include, but are not limited to, Optical Character Recognition (OCR), compression, or image processing. Furthermore, according to the first embodiment, the functions X, Y, and Z are the same type of functions and, among the functions X, Y, and Z, the function X has the highest functional performance, the function Y has the second highest functional performance, and the function Z has the lowest functional performance, which is however not a limitation. The functional performance is the performance of the function itself and, as the functional performance is higher, the added value, such as convenience or quality, of the function is higher. Examples of the function X include the OCR that supports multiple languages of 3 or more languages, examples of the function Y include the OCR that supports 2 languages, and examples of the function Z include the OCR that supports 1 language.

Figure 5:
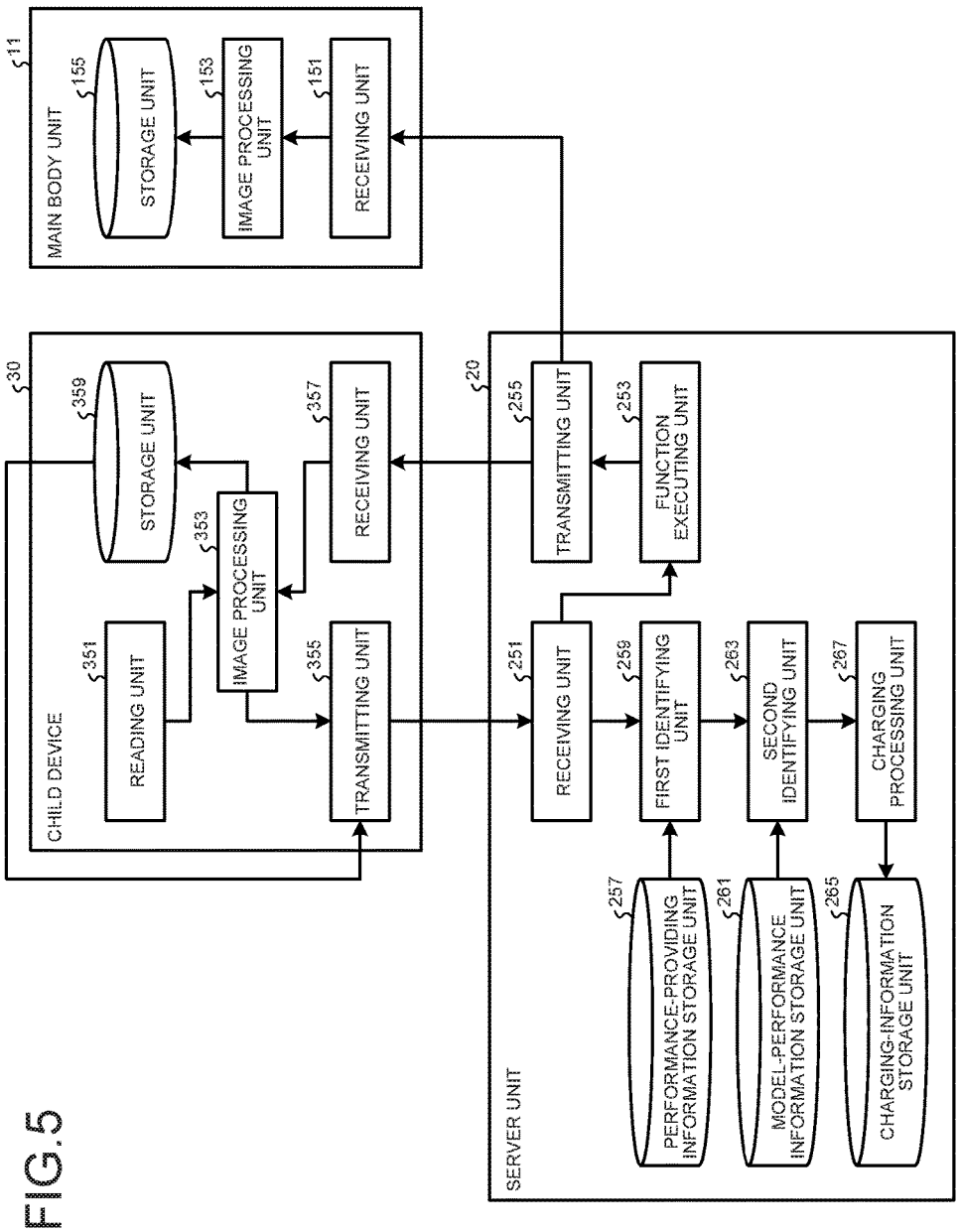
FIG. 5 is a block diagram that illustrates an example of the functional configuration of the charging processing system according to the first embodiment.

FIG. 5 is a block diagram that illustrates an example of the functional configuration of the charging processing system 1 according to the first embodiment. As illustrated in FIG. 5, the child device 30 includes a reading unit 351, an image processing unit 353, a transmitting unit 355, a receiving unit 357, and a storage unit 359. However, there is no limitation on the functional configuration that is included in the child device 30 and, for example, a functional unit, such as a print unit that conducts printing, may be included.

The reading unit 351 may be implemented by, for example, the scanner unit 301, the image processing unit 353 may be implemented by, for example, the CPU 305, the RAM 309, and the ASIC 319, the transmitting unit 355 and the receiving unit 357 may be implemented by, for example, the CPU 305, the RAM 309, and the NIC 317, and the storage unit 359 may be implemented by, for example, the HDD 315.

Furthermore, as illustrated in FIG. 5, the server unit 20 includes a receiving unit 251, a function executing unit 253, a transmitting unit 255, a performance-providing information storage unit 257, a first identifying unit 259, a model-performance information storage unit 261, a second identifying unit 263, a charging-information storage unit 265, and a charging processing unit 267.

The receiving unit 251 and the transmitting unit 255 may be implemented by, for example, the CPU 201, the RAM 205, and the NIC 209, the function executing unit 253, the first identifying unit 259, the second identifying unit 263, and the charging processing unit 267 may be implemented by, for example, the CPU 201 and the RAM 205, the performance-providing information storage unit 257, the model-performance information storage unit 261, and the charging-information storage unit 265 may be implemented by, for example, the HDD 207. Furthermore, if the server unit 20 also includes hardware, such as ASIC, the function executing unit 253 may be implemented further using the hardware.

Furthermore, as illustrated in FIG. 5, the main body unit 11 includes a receiving unit 151, an image processing unit 153, and a storage unit 155. However, there is no limitation on the functional configuration that is included in the main body unit 11, and a functional unit, such as a reading unit that conducts reading, a transmitting unit that transmits information, and a print unit that conducts printing, may be included.

The receiving unit 151 may be implemented by, for example, the CPU 105, the RAM 109, and the NIC 117, the image processing unit 153 may be implemented by, for example, the CPU 105, the RAM 109, and the ASIC 119, and the storage unit 155 may be implemented by, for example, the HDD 115.

First, the child device 30 is explained.

It is assumed that the menu screen is displayed on the operation panel 303 of the child device 30 to use the cooperative function of the server unit 20 during a scanner operation and on the menu screen, the user selects the function to be used (hereafter, referred to as the "first function") from among the differential functions, and the transmission destination of the image data on which the first function is executed by the server unit 20, and then presses the start button. Here, the differential function is the function X in the case of the child device 30-1, and the differential function is the functions X and Y in the case of the child device 30-2.

When the start button is pressed, the reading unit 351 electronically reads a document, which is a scan target, in response to a scan command from the operation panel 303 and generates image data. The image processing unit 353 performs various types of image processing on the image data that is read by the reading unit 351.

The transmitting unit 355 transmits the request to execute the first function that is selected by the user, to the server unit 20. According to the first embodiment, the request to execute the first function includes, but are not limited to, the image data on which various types of image processing has been performed by the image processing unit 353, the transmission destination information that indicates the transmission destination that is selected by the user, the function identification information for identifying the first function, and the model identification information for identifying the model of the child device 30.

Furthermore, examples of the transmission destination information include IP address, examples of the function identification information include the function ID, and examples of the model identification information include the model name. The transmitting unit 355 acquires the transmission destination information, the function identification information, and the model identification information from the storage unit 359 when, for example, the user selects the transmission destination and the first function.

Here, the explanation of the child device 30 is temporarily stopped, and the server unit 20 is explained.

The receiving unit 251 receives the request to execute the first function from the child device 30. For example, when the receiving unit 251 receives the request to execute the first function, the receiving unit 251 stores the image data included in the request to execute the first function, in the folder that corresponds to the first function indicated by the function identification information about the first function which is included in the request to execute the first function.

The function executing unit 253 executes the first function. As described above, as a folder is associated with each of the first functions, the function executing unit 253 performs the function which corresponds to the folder, on the image data that is stored in the folder according to the first embodiment.

For example, it is assumed that, if the first function is the function X, the image data is stored in a folder 1 and, if the first function is the function Y, the image data is stored in a folder 2. In this case, the function executing unit 253 performs the function X on the image data that is stored in the folder 1 and performs the function Y on the image data that is stored in the folder 2.

The transmitting unit 255 transmits the image data on which the first function has been performed by the function executing unit 253, to the transmission destination that is indicated by the transmission destination information which is included in the request to execute the first function, received by the receiving unit 251.

Here, the explanation of the server unit 20 is temporarily stopped, and the child device 30 and the main body unit 11 are explained.

If the transmission destination, indicated by the transmission destination information, is the child device 30, the receiving unit 357 receives the image data on which the first function has been performed, from the server unit 20. The image processing unit 353 performs various types of image processing on the image data received by the receiving unit 357, if needed. The storage unit 359 stores the image data that is received by the receiving unit 357. Thereby, the scanner operation is completed.

Furthermore, if the transmission destination indicated by the transmission destination information is the main body unit 11, the receiving unit 151 receives the image data on which the first function has been performed, from the server unit 20. The image processing unit 153 performs various types of image processing on the image data received by the receiving unit 151, if needed. The storage unit 155 stores the image data that is received by the receiving unit 151. Thereby, the scanner operation is completed.

Here, the server unit 20 is explained again.

The performance-providing information storage unit 257 stores the performance providing information in which each piece of function identification information which indicates a function is associated with the required performance information that indicates the required performance of the function.

FIG. 6 is a diagram that illustrates an example of the performance providing information according to the first embodiment. In the example illustrated in FIG. 6, as described above, the function X is a function with the highest required performance, the function Y is a function with the second highest required performance, and the function Z is a function with the lowest required performance. Furthermore, in the example illustrated in FIG. 6, the required performance, indicated by the required performance information, is represented in the rank of specification, and a larger number indicates a higher rank and a higher required performance, which is however not a limitation.

The first identifying unit 259 acquires the performance providing information from the performance-providing information storage unit 257 and determines the required performance of the first function on the basis of the performance providing information and the function identification information about the first function which is included in the request to execute the first function, received by the receiving unit 251.

For example, if the performance providing information is as illustrated in FIG. 6 and if the function identification information about the first function indicates the function X, the first identifying unit 259 determines that the required performance of the first function is "3" and, for example, if the performance providing information is as illustrated in FIG. 6 and if the function identification information about the first function indicates the function Y, determines that the required performance of the first function is "2".

The model-performance information storage unit 261 stores the model performance information in which each piece of model identification information which indicates a model is associated with the performance information that indicates the performance of the model. Here, the model performance information may be previously stored in the model-performance information storage unit 261, or the combination of the model identification information and the performance information acquired from each of the child devices 30 may be stored as the model performance information in the model-performance information storage unit 261.

FIG. 7 is a diagram that illustrates an example of the model performance information according to the first embodiment. In the example illustrated in FIG. 7, a model A has the highest performance, a model B has the second highest performance, and a model C has the lowest performance. Furthermore, according to the first embodiment, it is assumed that the main body unit 11 is of the model A, the child device 30-1 is of the model B, and the child device 30-2 is of the model C.

The second identifying unit 263 acquires the model performance information from the model-performance information storage unit 261 and determines the performance of the child device 30 on the basis of the model performance information and the model identification information about the child device 30 which is included in the request to execute the first function received by the receiving unit 251.

For example, if the model performance information is as illustrated in FIG. 7 and the model identification information about the child device 30 indicates the model B (the child device 30 is the child device 30-1), the second identifying unit 263 determines that the performance of the child device 30-1 is "2" and, for example, if the model performance information is as illustrated in FIG. 7 and the model identification information about the child device 30 indicates the model C (the child device 30 is the child device 30-2), determines that the performance of the child device 30-2 is "1".

The charging processing unit 267 performs charging processing such that the amount of charge for execution of the first function is larger as there is a larger difference between the required performance of the first function determined by the first identifying unit 259, and the performance of the child device 30 determined by the second identifying unit 263, and the charging processing unit 267 saves (stores) the charging information in the charging-information storage unit 265. Examples of the charging information include, but are not limited to, the information in which the charge-amount information that indicates the amount of charge, the charging-date information that indicates the charging date, the function identification information about the first function, and the model identification information about the child device 30 are associated with each other.

Furthermore, the charging processing unit 267 adds up the amount of money which is included in the charging information that is stored in the charging-information storage unit 265, in a predetermined unit, such as month, term, or year, thereby calculating the amount of bill for the customer who uses the charging processing system 1. This amount of bill is charged to the customer.

The charging processing unit 267 uses, for example, Equation (1) to calculate the amount of charge.

$$\text{Amount of charge} = \alpha^{\wedge}(\text{required performance} - \text{performance} - 1) \times N1 \quad (1)$$

Here, $\alpha > 1$, and N1 is the amount of charge by default.

For example, if the request to execute the first function is the request to execute the function X from the child device 30-1, the required performance of the first function is "3", and the performance of the child device 30-1 is "2". In this case, if Equation (1) is used, the amount of charge is $\alpha^{\wedge}(3-2-1) \times N1 = \alpha^{0} \times N1 = N1$.

Furthermore, for example, if the request to execute the first function is the request to execute the function X from the child device 30-2, the required performance of the first function is "3", and the performance of the child device 30-2 is "1". In this case, if Equation (1) is used, the amount of charge is $\alpha^{\wedge}(3-1-1) \times N1 = \alpha^{1} \times N1 = \alpha N1$.

Here, although Equation (1) is an example for determining the amount of charge on a job basis, the amount of charge may be determined on a page basis. In this case, a change may be made such that the value of N1 is changed into the amount of charge by default on a page basis and the amount of charge is increased in proportion to the number of pages.

Figure 8:
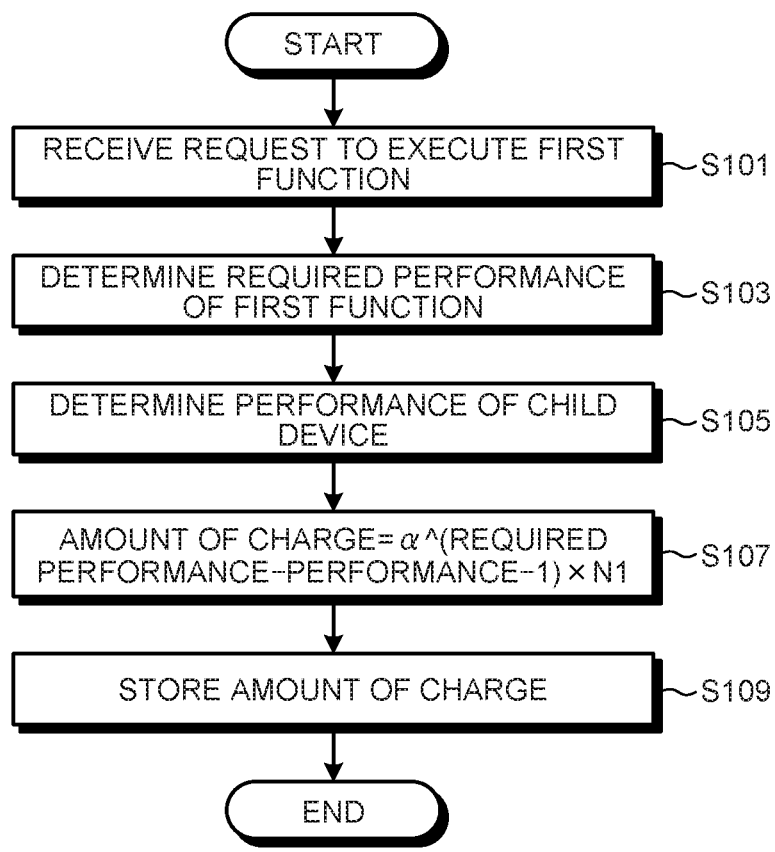
FIG. 8 is a flowchart that illustrates an example of the process that is performed by a server unit according to the first embodiment.

FIG. 8 is a flowchart that illustrates an example of the process that is performed by the server unit 20 according to the first embodiment. Here, the flowchart illustrated in FIG. 8 represents a process relating to the charging processing.

First, the receiving unit 251 receives the request to execute the first function from the child device 30 (Step S101).

Next, the first identifying unit 259 acquires the performance providing information from the performance-providing information storage unit 257 and determines the required performance of the first function on the basis of the performance providing information and the function identification information about the first function which is included in the request to execute the first function received by the receiving unit 251 (Step S103).

Next, the second identifying unit 263 acquires the model performance information from the model-performance information storage unit 261 and determines the performance of the child device 30 on the basis of the model performance information and the model identification information about the child device 30 which is included in the request to execute the first function received by the receiving unit 251 (Step S105).

Then, the charging processing unit 267 determines the amount of charge using the equation: amount of charge=α^(required performance−performance−1)λN1 (Step S107), and stores the amount of charge (charging information) in the charging-information storage unit 265 (Step S109).

As described above, according to the first embodiment, it is possible to perform charging processing for the use of a cooperative function in accordance with the value of the differential function that becomes usable with the cooperative function.

Here, in a case where the same differential function becomes usable with the child devices 30-1 to 30-2, which have different performances, it is considered that the value of the differential function that becomes usable with the child device 30-2, which has a low performance, is higher than the value of the differential function that becomes usable with the child device 30-1, which has a higher performance. That is, if a differential function becomes usable with the child device 30, it is considered that the value of the differential function is higher as the performance of the child device 30 is lower.

In this manner, according to the first embodiment, charging processing is performed such that, as there is a larger difference between the required performance of the first function and the performance of the second device, the amount of charge for execution of the first function is larger; thus, it is possible to perform charging processing for the use of a cooperative function in accordance with the value of the differential function that becomes usable with the cooperative function.

Modified Example 1

In a modified example 1, an explanation is further given of an example where charging processing is performed such that the amount of charge is larger as the time period which elapsed after a child device becomes able to use the first function, is longer according to the first embodiment. An explanation is principally given below of the difference from the first embodiment, and the same names and reference numerals as in the first embodiment are applied to the components that have the same functions as in the first embodiment, and the explanation of the components is omitted.

Figures 9, 10:
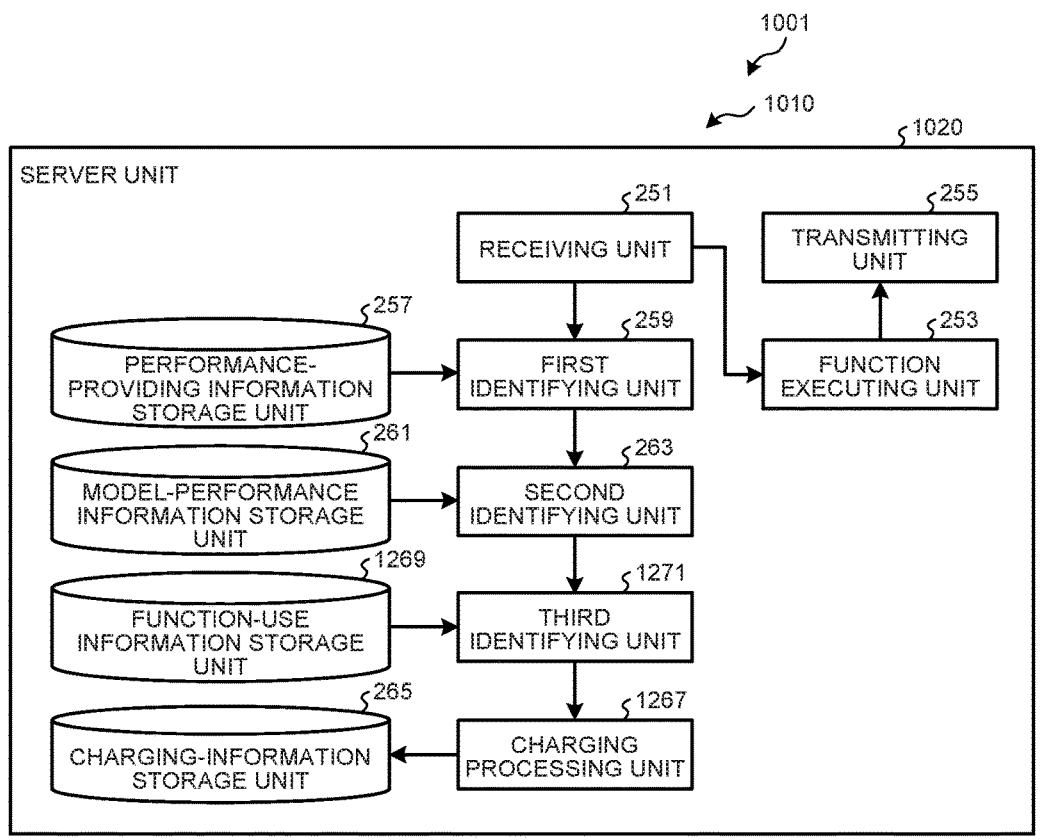
FIG. 9 is a block diagram that illustrates an example of the functional configuration of a server unit according to a modified example 1.
FIG. 10 is a diagram that illustrates an example of the function use information according to the modified example 1.

FIG. 9 is a block diagram that illustrates an example of the functional configuration of a server unit 1020 of a parent device 1010 in a charging processing system 1001 according to the modified example 1. As illustrated in FIG. 9, the server unit 1020 according to the modified example 1 is different from the first embodiment in a charging processing unit 1267, a function-use information storage unit 1269, and a third identifying unit 1271. The function-use information storage unit 1269 may be implemented by, for example, the HDD 207, and the third identifying unit 1271 may be implemented by, for example, the CPU 201 or the RAM 205.

According to the modified example 1, the request to execute the first function, received by the receiving unit 251, further includes the device identification information for identifying the child device 30. Examples of the device identification information include a media access control (MAC) address and a serial number. For example, when a user selects the transmission destination and the first function, the transmitting unit 355 of the child device 30 acquires the device identification information from the storage unit 359.

The function-use information storage unit 1269 stores the function use information in which each combination of the device identification information indicating a device, and the function identification information indicating a function, is associated with the use start-date information indicating the date on which the use of the function is started by the device. The date on which the use of the function is started may be, for example, the date on which the child device 30 becomes able to use the function using the cooperative function of the server unit 1020.

FIG. 10 is a diagram that illustrates an example of the function use information according to the modified example 1. In the example illustrated in FIG. 10, the date on which the child device 30-1 starts to use the function X, the date on which the child device 30-2 starts to use the function X, and the date on which the child device 30-2 starts to use the function Y are all "2015/1/10". Here, also in FIG. 10, the child device 1 indicates the child device 30-1, and the child device 2 indicates the child device 30-2.

The third identifying unit 1271 acquires the function use information from the function-use information storage unit 1269 and determines the time period which elapsed after the child device 30 become able to use the first function, on the basis of the function use information, the function identification information about the first function which is included in the request to execute the first function received by the receiving unit 251, and the device identification information about the child device 30.

For example, if the function use information is as illustrated in FIG. 10, the function identification information about the first function indicates the function X, and the device identification information about the child device 30 indicates the child device 30-1, the third identifying unit 1271 determines that the elapsed time period is the period from "2015/1/10" to "present day". If, for example, the function use information is as illustrated in FIG. 10, the function identification information about the first function indicates the function Y, and the device identification information about the child device 30 indicates the child device 30-2, the third identifying unit 1271 determines that the elapsed time period is the period from "2015/1/10" to "present day".

Furthermore, the charging processing unit 1267 performs charging processing such that the amount of charge is larger as the time period which elapsed after the child device 30 identified by the third identifying unit 1271, becomes able to use the first function, is longer. The charging processing unit 1267 uses, for example, Equation (2) to calculate the amount of charge.

$$\text{Amount of charge}=\gamma^{\hat{}}(\text{current year}-\text{use start year})\times\alpha^{\hat{}} \\ (\text{required performance}-\text{performance}-1)\times N1 \quad (2)$$

Here, γ>1, the current year is the year to which the present date belongs, and the use start year is the year to which the date on which the child device 30 starts to use the first function belongs.

For example, the request to execute the first function is a request to execute the function X from the child device 30-1, the required performance of the first function is "3", the performance of the child device 30-1 is "2", the date on which the child device 30-1 starts to use the function X is "2015/1/10", and the present date is "2015/3/1". In this case, if Equation (2) is used, the amount of charge is $\gamma\hat{}(2015-2015)\times\alpha\hat{}(3-2-1)\times N1=\gamma^0\times\alpha^0\times N1=N1$.

Furthermore, for example, if the request to execute the first function is a request to execute the function X from the child device 30-1, the required performance of the first function is "3", the performance of the child device 30-1 is "2", the date on which the child device 30-1 starts to use the function X is "2015/1/10", and the present date is "2016/3/1". In this case, if Equation (2) is used, the amount of charge is $\gamma\hat{}(2016-2015)\times\alpha\hat{}(3-2-1)\times N1=\gamma^1\times\alpha^0\times N1=\gamma N1$.

Figure 11:
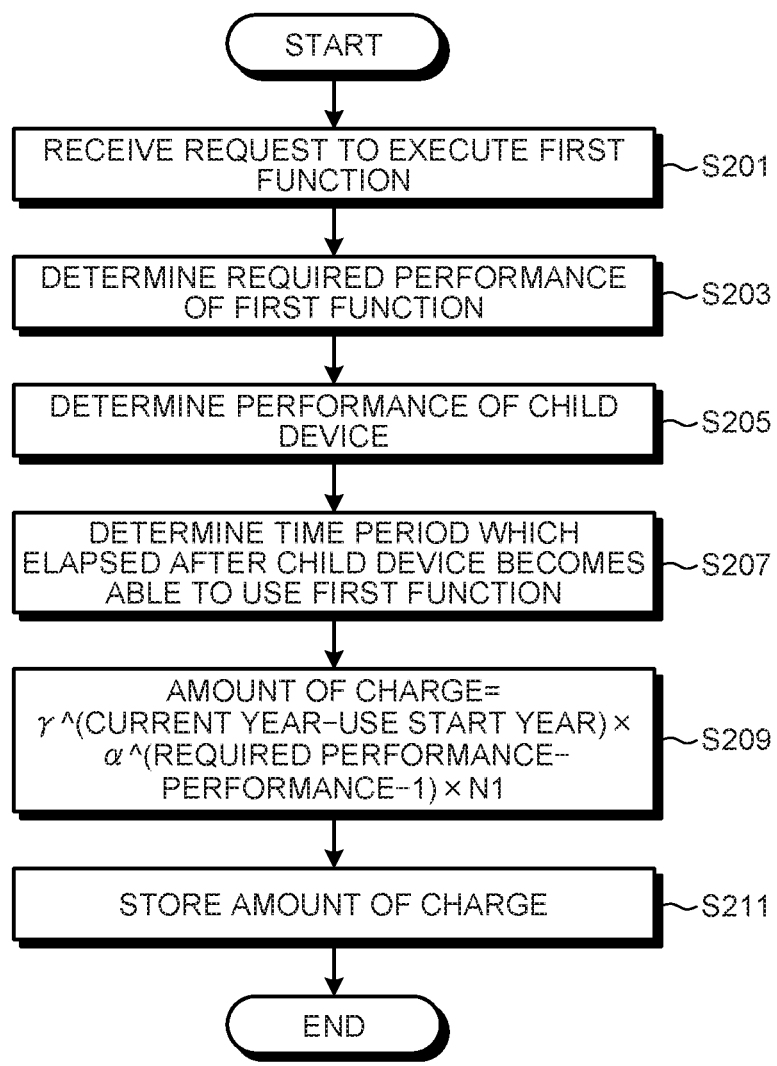
FIG. 11 is a flowchart that illustrates an example of the process that is performed by the server unit according to the modified example 1.

FIG. 11 is a flowchart that illustrates an example of the process that is performed by the server unit 1020 according to the modified example 1. Furthermore, the flowchart, illustrated in FIG. 11, represents a process relating to the charging processing.

First, the operations from Step S201 to Step S205 are the same as the operations from Step S101 to Step S105 in FIG. 8.

Next, the third identifying unit 1271 acquires the function use information from the function-use information storage unit 1269 and determines the time period which elapsed after the child device 30 becomes able to use the first function, on the basis of the function use information, the function identification information about the first function which is included in the request to execute the first function received by the receiving unit 251, and the device identification information about the child device 30 (Step S207).

Then, the charging processing unit 1267 determines the amount of charge using amount of charge=$\gamma\hat{}$(current year−use start year)$\times\alpha\hat{}$(required performance−performance−1)$\times$N1 (Step S209) and stores the amount of charge (charging information) in the charging-information storage unit 265 (Step S211).

As described above, according to the modified example 1, it is also possible to perform charging processing for the use of a cooperative function in accordance with the value of the differential function that becomes usable with the cooperative function.

Here, in a case where a differential function is made usable with the child device 30, as the time period which elapsed after the differential function becomes usable with the child device 30, is longer, a customer is able to use the differential function for a longer time, even though the child device 30 was released long ago. Therefore, it is conceivable that, as the time period which elapsed after the differential function becomes usable with the child device 30, is longer, the value of the differential function is higher.

In this manner, according to the modified example 1, charging processing is performed such that the amount of charge is larger as the time period which elapsed after the child device 30 becomes able to use the first function, is longer; thus, it is possible to perform charging processing for the use of a cooperative function in accordance with the value of the differential function that becomes usable with the cooperative function.

However, although a differential function becomes usable with the child device 30, if the differential function becomes no longer new due to the elapse of a period of time or if a new function is developed by modifying the differential function after the elapse of a period of time, it is conceivable to use the configuration where, as the time period which elapsed after the differential function becomes usable with the child device 30, is longer, the value of the differential function is lower.

Therefore, instead of the charging processing that is performed such that the amount of charge is larger, as the time period which elapsed after the child device 30 becomes able to use the first function, is longer, charging processing may be performed such that the amount of charge is smaller. In this case, Equation (2) may use $\gamma<1$. In this way, it is possible to perform charging processing for the use of a cooperative function in accordance with the value of the differential function that becomes usable with the cooperative function.

Second Embodiment

In a second embodiment, an explanation is given of an example where charging processing is performed such that the amount of charge is larger as there is a larger difference between the functional performance of the first function and the functional performance of the second function which has a lower performance than the first function, instead of the difference between the required performance of the first function and the performance of the second device according to the first embodiment. An explanation is principally given below of the difference from the first embodiment, and the same names and reference numerals as in the first embodiment are applied to the components that have the same functions as in the first embodiment, and the explanation of the components is omitted.

Figures 12, 13:
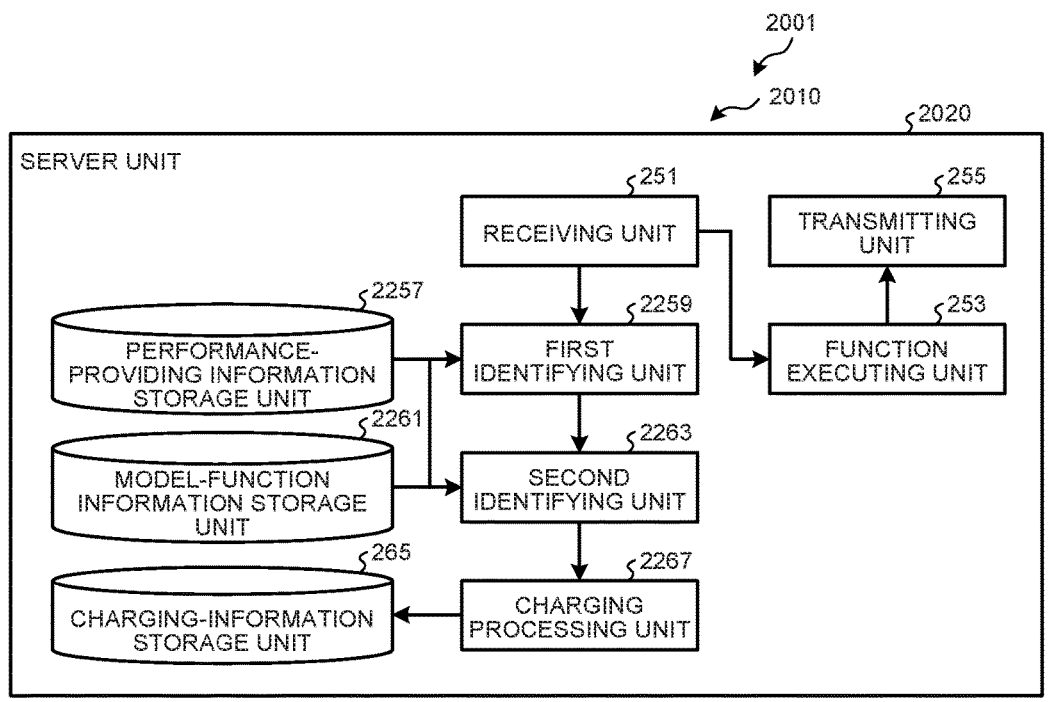
FIG. 12 is a block diagram that illustrates an example of the functional configuration of a server unit according to a second embodiment.
FIG. 13 is a diagram that illustrates an example of the performance providing information according to the second embodiment.

FIG. 12 is a block diagram that illustrates an example of the functional configuration of a server unit 2020 of a parent device 2010 in a charging processing system 2001 according to the second embodiment. As illustrated in FIG. 12, the server unit 2020 according to the second embodiment is different from the first embodiment in a performance-providing information storage unit 2257, a first identifying unit 2259, a charging processing unit 2267, a model-function information storage unit 2261, and a second identifying unit 2263.

The performance-providing information storage unit 2257 stores the performance providing information in which each piece of function identification information indicating a function, is associated with the functional performance information indicating the functional performance of the function.

FIG. 13 is a diagram that illustrates an example of the performance providing information according to the second embodiment. In the example illustrated in FIG. 13, as described above, the function X is a function that has the highest functional performance, the function Y is a function that has the second highest functional performance, and the function Z is a function that has the lowest functional performance. Here, in the example illustrated in FIG. 13, the functional performance indicated by the functional performance information, is represented using the rank of the additional value of a function, and a larger number indicates a higher rank and a higher functional performance, which is however not a limitation.

The first identifying unit 2259 acquires the performance providing information from the performance-providing information storage unit 2257 and determines the functional performance of the first function on the basis of the performance providing information and the function identification information about the first function which is included in the request to execute the first function received by the receiving unit 251.

For example, if the performance providing information is as illustrated in FIG. 13 and the function identification information about the first function indicates the function X, the first identifying unit 2259 determines that the functional performance of the first function is "3" and, for example, if the performance providing information is as illustrated in FIG. 13 and the function identification information about the first function indicates the function Y, determines that the functional performance of the first function is "2".

The model-function information storage unit 2261 stores the model function information that defines whether a model has a function with respect to each combination of the model identification information indicating the model, and the function identification information indicating the function.

Figures 14, 15:
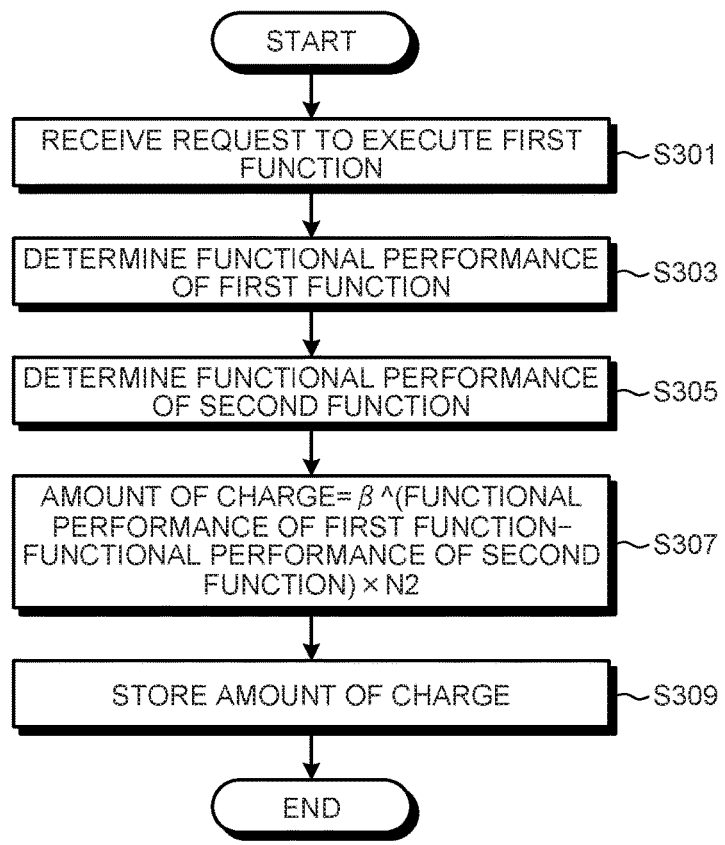
FIG. 14 is a diagram that illustrates an example of the model function information according to the second embodiment.
FIG. 15 is a flowchart that illustrates an example of the process that is performed by a server unit according to the second embodiment.

FIG. 14 is a diagram that illustrates an example of the model function information according to the second embodiment. In the example illustrated in FIG. 14, the model A has all the functions X, Y, and Z, the model B has the functions Y and Z, and the model C has the function Z. Furthermore, according to the second embodiment, it is also assumed that the main body unit 11 is of the model A, the child device 30-1 is of the model B, and the child device 30-2 is of the model C.

The second identifying unit 2263 acquires the model function information from the model-function information storage unit 2261 and acquires the performance providing information from the performance-providing information storage unit 2257 and, on the basis of the model function information, the performance providing information, and the model identification information about the child device 30 which is included in the request to execute the first function received by the receiving unit 251, determines the functional performance of the second function which is the function that has the lowest functional performance among the functions that the child device 30 does not have.

For example, if the model function information is as illustrated in FIG. 14, the performance providing information is as illustrated in FIG. 13, and the model identification information about the child device 30 indicates the model C (the child device 30 is the child device 30-2), the second identifying unit 2263 determines that the second function is the function Y that has the lowest functional performance among the functions X and Y which the child device 30 does not have, and determines that the functional performance of the second function is "2".

The charging processing unit 2267 performs charging processing such that, as there is a larger difference between the functional performance of the first function and the functional performance of the second function which has a lower performance than the first function and which the child device 30 does not have, the amount of charge for execution of the first function is larger. Specifically, the charging processing unit 2267 performs charging processing such that, as there is a larger difference between the functional performance of the first function identified by the first identifying unit 2259, and the functional performance of the second function identified by the second identifying unit 2263, the amount of charge for execution of the first function is larger. The charging processing unit 2267 uses, for example, Equation (3) to calculate the amount of charge.

$$\text{Amount of charge} = \beta^{\wedge}(\text{functional performance of first function} - \text{functional performance of second function}) \times N2 \quad (3)$$

Here, $\beta > 1$, and N2 is the amount of charge by default.

For example, if the request to execute the first function is a request to execute the function X from the child device 30-2, the functional performance of the first function is "3", and the functional performance of the function Y, which is the second function, is "2". In this case, if Equation (3) is used, the amount of charge is $\beta^{\wedge}(3-2) \times N2 = \beta^1 \times N2 = \beta N2$.

Furthermore, for example, if the request to execute the first function is a request to execute the function Y from the child device 30-2, the functional performance of the first function is "2", and the functional performance of the function Y, which is the second function, is "2". In this case, if Equation (3) is used, the amount of charge is $\beta^{\wedge}(2-2) \times N2 = \beta^0 \times N2 = N2$.

FIG. 15 is a flowchart that illustrates an example of the process that is performed by the server unit 2020 according to the second embodiment. Here, the flowchart illustrated in FIG. 15, represents a process relating to the charging processing.

First, the operation at Step S301 is the same as the operation at Step S101 of FIG. 8.

Next, the first identifying unit 2259 acquires the performance providing information from the performance-providing information storage unit 2257 and determines the functional performance of the first function on the basis of the performance providing information and the function identification information about the first function which is included in the request to execute the first function received by the receiving unit 251 (Step S303).

Then, the second identifying unit 2263 acquires the model function information from the model-function information storage unit 2261, acquires the performance providing information from the performance-providing information storage unit 2257, and determines the functional performance of the second function which is the function that has the lowest functional performance among the functions that the child device 30 does not have, on the basis of the model function information, the performance providing information, and the model identification information about the child device 30 which is included in the request to execute the first function received by the receiving unit 251 (Step S305).

Next, the charging processing unit 2267 determines the amount of charge using the equation: amount of charge=$\beta^{\wedge}$(functional performance of first function−functional performance of second function)×N2 (Step S307) and stores the amount of charge (charging information) in the charging-information storage unit 265 (Step S309).

As described above, according to the second embodiment, it is also possible to perform charging processing for the use of a cooperative function in accordance with the value of the differential function that becomes usable with the cooperative function.

Here, if differential functions which have different functional performances, become usable, it is considered that the differential function with a higher functional performance has a higher value than the differential function with a lower functional performance. That is, if a differential function becomes usable with the child device 30, it is considered that the differential function with a higher functional performance has a higher value.

In this manner, according to the second embodiment, charging processing is performed such that the amount of charge for execution of the first function is larger as there is a larger difference between the functional performance of the first function and the functional performance of the second function which has a lower functional performance than the first function and which the child device 30 does not have; thus, it is possible to perform charging processing for the use of a cooperative function in accordance with the value of the differential function that becomes usable with the cooperative function.

Modified Example 2

In a modified example 2, an explanation is further given of an example where charging processing is performed such that the amount of charge is larger as the time period which elapsed after the child device becomes able to use the first function, is longer according to the second embodiment. An explanation is principally given below of the difference from the second embodiment, and the same names and reference numerals as in the second embodiment are applied to the components that have the same functions as in the second embodiment, and the explanation of the components is omitted.

Figure 16:
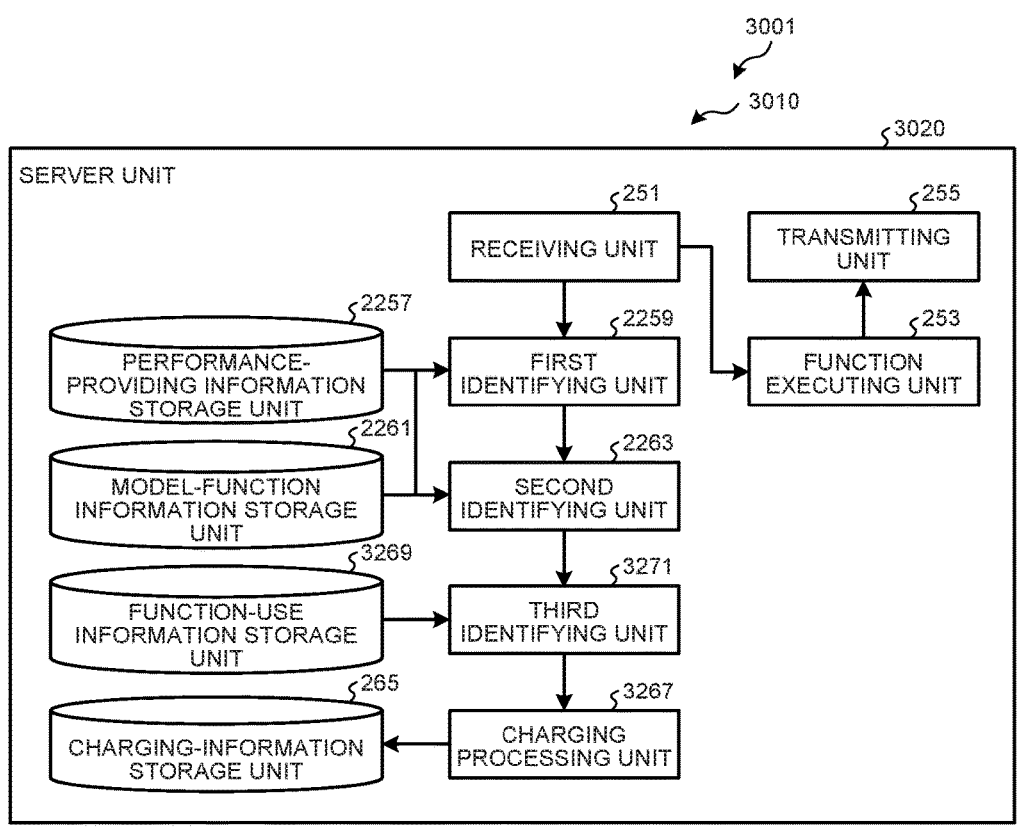
FIG. 16 is a block diagram that illustrates an example of the functional configuration of a server unit according to a modified example 2.

FIG. 16 is a block diagram that illustrates an example of the functional configuration of a server unit 3020 of a parent device 3010 in a charging processing system 3001 according to the modified example 2. As illustrated in FIG. 16, the server unit 3020 according to the modified example 2 is different from the second embodiment in a charging processing unit 3267, a function-use information storage unit 3269, and a third identifying unit 3271. The function-use information storage unit 3269 may be implemented by, for example, the HDD 207, and the third identifying unit 3271 may be implemented by, for example, the CPU 201 or the RAM 205.

According to the modified example 2, the request to execute the first function received by the receiving unit 251, further includes the device identification information for identifying the child device 30. Examples of the device identification information include a MAC address and a serial number. For example, when a user selects the transmission destination and the first function, the transmitting unit 355 of the child device 30 acquires the device identification information from the storage unit 359.

As the function-use information storage unit 3269 and the third identifying unit 3271 are the same as in the modified example 1, the explanation of the function-use information storage unit 3269 and the third identifying unit 3271 is omitted.

The charging processing unit 3267 uses, for example, Equation (4) to calculate the amount of charge.

$$\text{Amount of charge} = \gamma^{\wedge}(\text{current year} - \text{use start year}) \times \beta^{\wedge} (\text{functional performance of first function} - \text{functional performance of second function}) \times N2 \quad (4)$$

Here, $\gamma > 1$, the current year is the year to which the present date belongs, and the use start year is the year to which the date on which the child device 30 starts to use the first function belongs.

For example, the request to execute the first function is a request to execute the function X from the child device 30-2, the functional performance of the first function is "3", the functional performance of the function Y, which is the second function, is "2", the date on which the child device 30-2 starts to use the function X is "2015/1/10", and the present date is "2015/3/1". In this case, if Equation (4) is used, the amount of charge is $\gamma^{\wedge}(2015-2015) \times \beta^{\wedge}(3-2) \times N2 = \gamma^0 \times \beta^1 \times N2 = \beta N2$.

Furthermore, for example, the request to execute the first function is a request to execute the function X from the child device 30-2, the functional performance of the first function is "3", the functional performance of the function Y, which is the second function, is "2", the date on which the child device 30-2 starts to use the function X is "2015/1/10", and the present date is "2016/3/1". In this case, if Equation (4) is used, the amount of charge is $\gamma^{\wedge}(2016-2015) \times \beta^{\wedge}(3-2) \times N2 = \gamma^1 \times \beta^1 \times N2 = \gamma \beta N2$.

Figure 17:
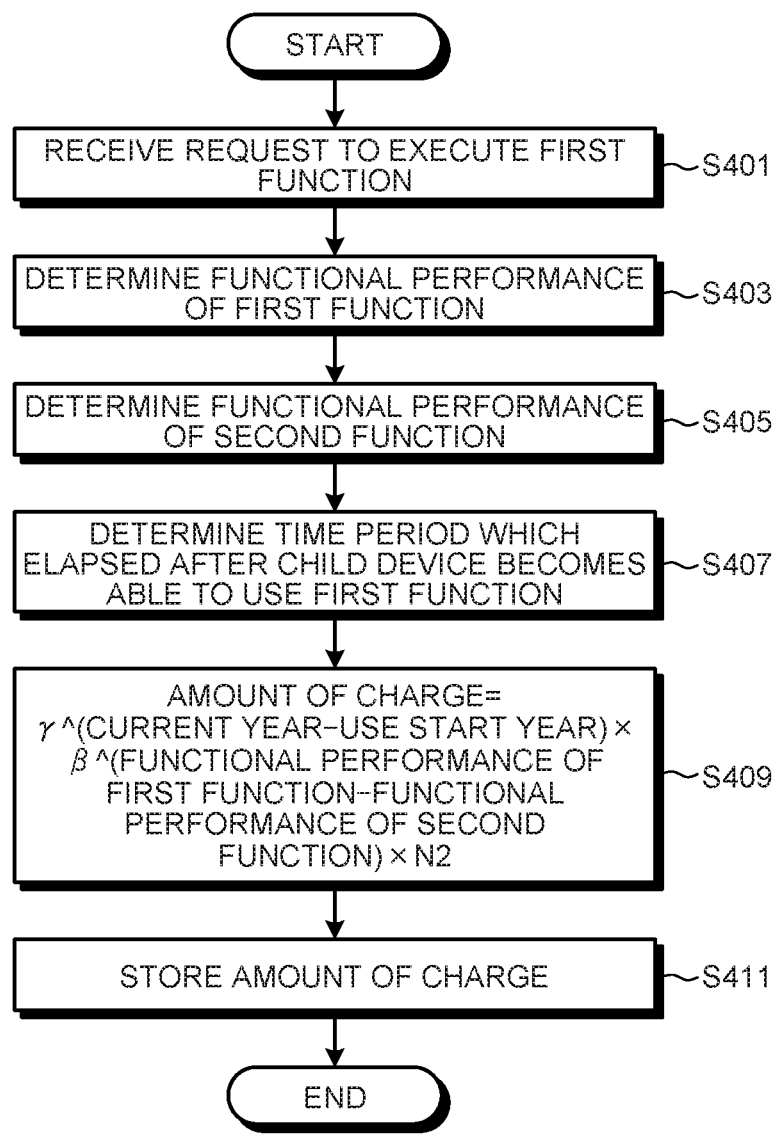
FIG. 17 is a flowchart that illustrates an example of the process that is performed by the server unit according to the modified example 2.

FIG. 17 is a flowchart that illustrates an example of the process that is performed by the server unit 3020 according to the modified example 2. Here, the flowchart, illustrated in FIG. 17, represents a process relating to the charging processing.

First, the operations from Step S401 to Step S405 are the same as the operations from Step S301 to Step S305 in FIG. 15.

Next, the third identifying unit 3271 acquires the function use information from the function-use information storage unit 3269 and determines the time period which elapsed after the child device 30 becomes able to use the first function, on the basis of the function use information, the function identification information about the first function which is included in the request to execute the first function received by the receiving unit 251, and the device identification information about the child device 30 (Step S407).

Then, the charging processing unit 3267 determines the amount of charge using the equation: amount of charge=$\gamma^{\wedge}$ (current year−use start year)×$\beta^{\wedge}$(functional performance of first function−functional performance of second function)× N2 (Step S409) and stores the amount of charge (charging information) in the charging-information storage unit 265 (Step S411).

As described above, according to the modified example 2, it is also possible to perform charging processing for the use of a cooperative function in accordance with the value of the differential function that becomes usable with the cooperative function.

Here, in a case where a differential function is made usable with the child device 30, as the time period which elapsed after the child device 30 becomes able to use the differential function, is longer, a customer is able to use the differential function for a longer time, even though the child device 30 was released long ago; therefore, it is conceivable that, as the time period which elapsed after the differential function becomes usable with the child device 30, is longer, the value of the differential function is higher.

In this manner, according to the modified example 2, charging processing is performed such that the amount of charge is larger as the time period which elapsed after the child device 30 becomes able to use the first function, is longer; thus, it is possible to perform charging processing for the use of a cooperative function in accordance with the value of the differential function that becomes usable with the cooperative function.

However, although a differential function becomes usable with the child device 30, if the differential function becomes no longer new due to the elapse of a period of time or if a new function is developed by modifying the differential function after the elapse of a period of time, it is conceivable that, as the time period which elapsed after the differential function becomes usable with the child device 30, is longer, the value of the differential function is lower.

Therefore, instead of the charging processing that is performed such that the amount of charge is larger, as the time period which elapsed after the child device 30 becomes able to use the first function, is longer, charging processing may be performed such that the amount of charge is smaller. In this case, Equation (4) may use $\gamma < 1$. In this way, it is also possible to perform charging processing for the use of a cooperative function in accordance with the value of the differential function that becomes usable with the cooperative function.

Modified Example 3

In a modified example 3, an explanation is given of an example where a function executing unit is included in the main body unit instead of the server unit according to the first embodiment. An explanation is principally given below of the difference from the first embodiment, and the same names and reference numerals as in the first embodiment are applied to the components that have the same functions as in the first embodiment, and the explanation of the components are omitted.

Figure 18:
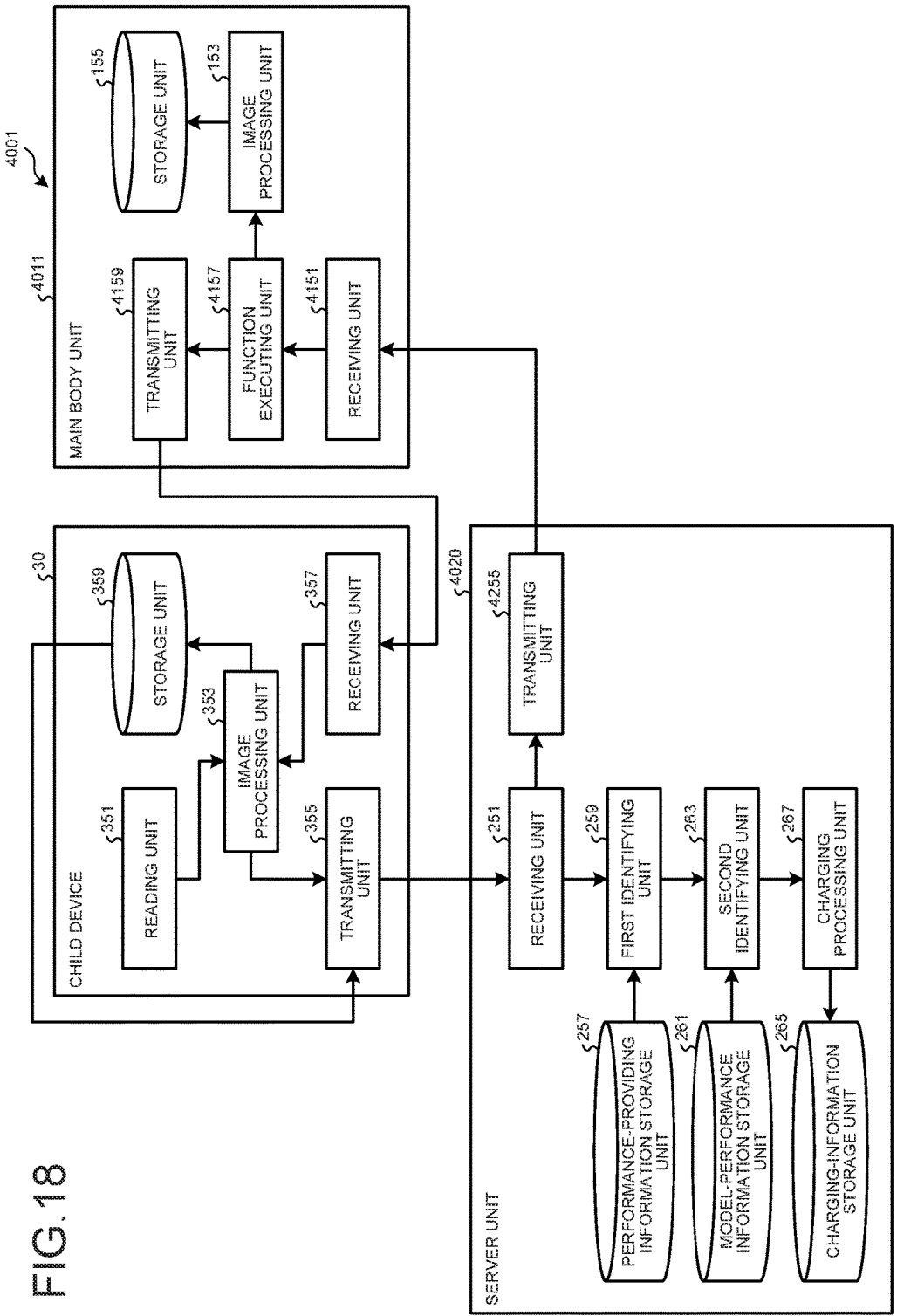
FIG. 18 is a block diagram that illustrates an example of the functional configuration of a charging processing system according to a modified example 3.

FIG. 18 is a block diagram that illustrates an example of the functional configuration of a charging processing system 4001 according to the modified example 3. As illustrated in FIG. 18, a server unit 4020 of a parent device 4010 according to the modified example 3 is different from the first embodiment in a transmitting unit 4255, and a main body unit 4011 is different from the first embodiment in a receiving unit 4151, a function executing unit 4157, and a transmitting unit 4159. The function executing unit 4157 may be implemented by, for example, the CPU 105, the RAM 109, or the ASIC 119, and the transmitting unit 4159 may be implemented by, for example, the CPU 105, the RAM 109, or the NIC 117.

The transmitting unit 4255 transmits the request to execute the first function, received by the receiving unit 251, to the main body unit 4011.

The receiving unit 4151 receives the request to execute the first function from the server unit 4020. For example, when the receiving unit 4151 receives the request to execute the first function, the receiving unit 4151 stores the image data included in the request to execute the first function, in the folder associated with the first function indicated by the function identification information about the first function included in the request to execute the first function.

The function executing unit 4157 executes the first function. As described above, a folder is associated with each first function; therefore, according to the modified example 3, the function executing unit 4157 performs the function associated with the folder, on the image data that is stored in the folder.

For example, if the first function is the function X, the image data is stored in the folder 1 and, if the first function is the function Y, the image data is stored in the folder 2. In this case, the function executing unit 4157 performs the function X on the image data that is stored in the folder 1 and performs the function Y on the image data that is stored in the folder 2.

If the main body unit 4011 is the transmission destination that is indicated by the transmission destination information which is included in the request to execute the first function received by the receiving unit 4151, the image processing unit 153 performs various types of image processing on the image data on which the first function has been executed by the function executing unit 4157, if needed. The storage unit 155 stores the image data on which the first function has been performed by the function executing unit 4157. Thereby, the scanner operation is completed.

If the child device 30 is the transmission destination that is indicated by the transmission destination information which is included in the request to execute the first function received by the receiving unit 4151, the transmitting unit 4159 transmits the image data on which the first function has been performed by the function executing unit 4157, to the child device 30.

As in the modified example 3, the function executing unit may be included in the main body unit instead of the server unit, which is particularly effective if the differential function is not an electronic function, such as image processing, but a physical function, such as a punch function or a staple function during a print operation or a copy operation. Furthermore, the same modification as in the modified example 3 may be made to not only the first embodiment but also the second embodiment and the modified examples 1 and 2.

Modified Example 4

Figure 19:
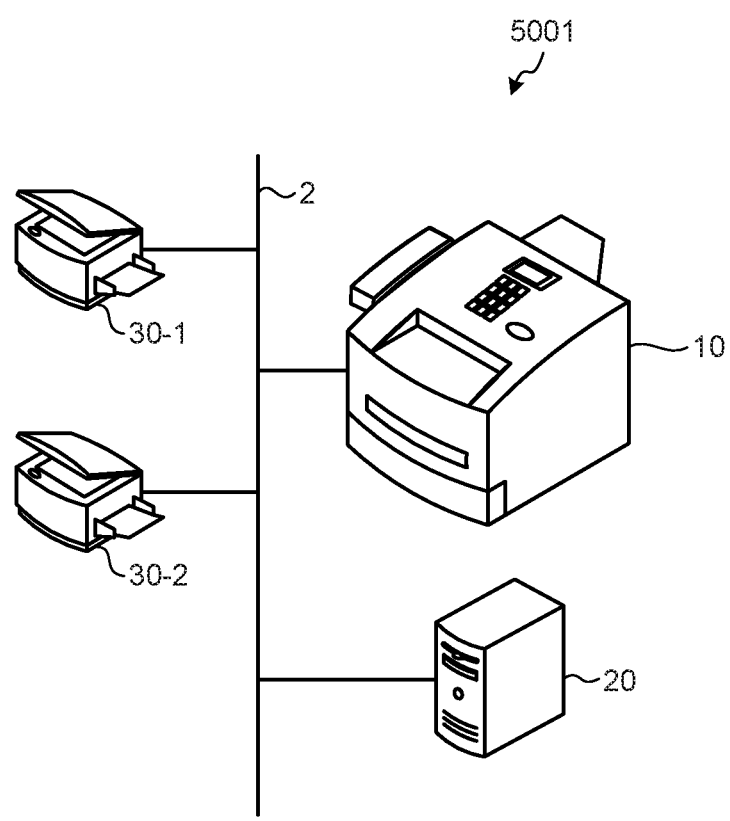
FIG. 19 is a schematic diagram that illustrates an example of a charging processing system according to a modified example 4.

In the first embodiment, an explanation is given using, for example, a case where the server unit 20 is incorporated in the parent device 10 and is internally connected to the main body unit 11; however, as in a charging processing system 5001 that is illustrated in FIG. 19, the server unit 20 may be connected to the network 2 from outside of the parent device 10 so that the server unit 20 and the parent device 10 are connected via the network 2. In this case, the parent device 10 is equivalent to the main body unit 11. Furthermore, the same modification as in the modified example 4 may be made to not only the first embodiment but also the second embodiment and the modified examples 1 to 3.

Program

A program that is executed by the main body unit, the server unit, and the child device according to each of the above-described embodiments and each of the modified examples (hereafter, referred to as "each device according to each of the above-described embodiments and each of the modified examples) is stored in the form of a file that is installable or executable in a recording medium readable by a computer, such as a CD-ROM, a CD-R, a memory card, a digital versatile disk (DVD), or a flexible disk (FD), to provide the program.

Furthermore, a program that is executed by each device according to each of the above-described embodiments and each of the modified examples may be stored in a computer connected via a network, such as the Internet, and downloaded via the network to provide the program. Furthermore, a program that is executed by each device according to each of the above-described embodiments and each of the modified examples may be provided or distributed via a network such as the Internet. Moreover, a program that is executed by each device according to each of the above-described embodiments and each of the modified examples may be previously installed in a ROM, or the like to provide the program.

A program that is executed by each device according to each of the above-described embodiments and each of the modified examples has a modular configuration for implementing the above-described units on the computer. In terms of the actual hardware, for example, the CPU reads out the program from the ROM onto the RAM so as to execute the program, thereby implementing each of the above-described functional units on the computer.

An embodiment provides an advantage that charging processing can be performed with regard to the use of a cooperative function in accordance with the relationship between a device and a differential function which is used with the device, or the like.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A charging processing system comprising:
   at least one memory and at least one processor, the at least one memory containing instructions that, when executed by the at least one processor, configure the at least one processor to,
   receive, from a second device, a request to execute a first function, the first function being executable at a first device and non-executable at the second device;
   execute the first function at the first device and provide results of same to the second device such that the second device cooperates with the first device to execute the first function; and
   automatically, determine an amount of charge for execution of the first function in response to a difference between a performance with regard to the first function and one of (i) a performance of the second device and (ii) a performance with regard to a second function, the second function being a function having a lower performance than the first function and non-executable at the second device such that the at least one processor determines the amount of charge attributable to the second device for cooperative execution of the first function by the first device on behalf of the second device that is unable to execute the first function, where the amount of charge attributed to the second device for the cooperative execution of the first function varies based on one of (i) the performance of the second device, which is unable to executable the first function, and (ii) the performance of a function having lower performance than the first function and also available to the second device only through the cooperative execution with the first device.

2. The charging processing system according to claim 1, wherein the at least one memory contains instructions that, when executed by the at least one processor, configure the at least one processor to determine that the amount of charge is larger as a time period after the second device cooperates with the first device to use the first function increases.

3. The charging processing system according to claim 2, wherein the request to execute the first function includes function identification information identifying the first function, model identification information identifying a model of the second device, and device identification information identifying the second device, and the at least one memory contains instructions that, when executed by the at least one processor, further configures the at least one processor to,
   acquire performance providing information associating the function identification information with required performance information, the required performance information indicating a required performance required for execution of the first function,
   determine the required performance of the first function based on the performance providing information and the function identification information,
   acquire model performance information associating the model identification information with model performance information, the model performance information indicating a performance of the model of the second device,
   determine a performance of the second device based on the model performance information and the model identification information about the second device,
   acquire function use information associating each combination of the device identification information and the function identification information with use start-date information, the use start-date information indicating a date on which the second device starts to use the first function, and
   determine an elapsed time period based on the function use information, the function identification information, and the device identification information.

4. The charging processing system according to claim 2, wherein the request to execute the first function includes function identification information identifying the first function, model identification information identifying a model of the second device, and device identification information identifying the second device, and the at least one memory contains instructions that, when executed by the at least one processor, further configures the at least one processor to,
   acquire performance providing information associating the function identification information with functional performance information, the functional performance information indicating a functional performance of the function, determine the functional performance of the first function based on the performance providing information and the function identification information, acquire the performance providing information and model function information, the model function information indicating whether a model has a function with respect to each combination of the model identification information and the function identification information, determine a functional performance of the second function based on the model function information, the performance providing information, and the model identification information, the second function being a function that has a lowest functional performance among functions that are non-executable at the second device, acquire function use information associating each combination of the device identification information and the function identification information with use start-date information, the use start-date information indicating a date on which the second device starts to use the function, and determine an elapsed time period based on the function use information, the function identification information, and the device identification information.

5. The charging processing system according to claim 1, wherein the at least one memory contains instructions that, when executed by the at least one processor, configure the at least one processor to determine that the amount of charge is smaller as a time period after the second device cooperates with the first device to use the first function increases.

6. The charging processing system according to claim 5, wherein the request to execute the first function includes function identification information identifying the first function, model identification information identifying a model of the second device, and device identification information identifying the second device, and the at least one memory contains instructions that, when executed by the at least one processor, further configures the at least one processor to, acquire performance providing information associating the function identification information with required performance information, the required performance information indicating a required performance required for execution of the first function, determine the required performance of the first function based on the performance providing information and the function identification information, acquire model performance information associating the model identification information with model performance information, the model performance information indicating a performance of the model, determine a performance of the second device based on the model performance information and the model identification information, acquire function use information associating each combination of the device identification information and the function identification information with use start-date information, the use start-date information indicating a date on which the second device starts to use the function, and determine an elapsed time period based on the function use information, the function identification information about the first function, and the device identification information.

7. The charging processing system according to claim 5, wherein the difference is between a functional performance of the first function and a functional performance of the second function, the request to execute the first function includes function identification information for identifying the first function, model identification information for identifying a model of the second device, and device identification information for identifying the second device, and the charging processing system further comprising:

acquire performance providing information in which each piece of function identification information indicating a function, is associated with functional performance information indicating a functional performance of the function, determine a functional performance of the first function based on the performance providing information and the function identification information about the first function, acquire the performance providing information and model function information that defines whether a model has a function with respect to each combination of model identification information indicating the model, and function identification information indicating the function, and determine a functional performance of the second function which is a function that has a lowest functional performance among functions that the second device does not have, based on the model function information, the performance providing information, and the model identification information about the second device, acquire function use information in which each combination of device identification information indicating a device, and function identification information indicating a function is associated with use start-date information indicating a date on which the device starts to use the function, and determine an elapsed time period based on the function use information, the function identification information about the first function, and the device identification information about the second device.

8. The charging processing system according to claim 1, wherein the request to execute the first function includes function identification information identifying the first function and model identification information identifying a model of the second device, and the at least one memory contains instructions that, when executed by the at least one processor, further configures the at least one processor to, acquire performance providing information associating the function identification information with required performance information, the required performance information indicating a performance required for execution of the first function, determine a required performance of the first function based on the performance providing information and the function identification information, acquire model performance information associating the model identification information with model performance information, the model performance information indicating a performance of the model of the second device, and determine a performance of the second device based on the model performance information and the model identification information.

9. The charging processing system according to claim 1, wherein the request to execute the first function includes function identification information identifying the first function and model identification information identifying a model of the second device, and the at least one memory contains instructions that, when executed by the at least one processor, further configures the at least one processor to, acquire performance providing information associating the function identification information with functional performance information, the functional performance information indicating a functional performance of the first function, determine the functional performance of the first function based on the performance providing information and the function identification information, acquire the performance providing information and model function information, the model function information indicating whether a model has a function with respect to each combination of the model identification information, and the function identification information, and determine the functional performance of the second function based on the model function information, the performance providing information, and the model identification information, the second function being a function that has a lowest functional performance among functions that are non-executable at the second device.

10. The charging processing system according to claim 1, further comprising:
    an information processing apparatus, the information processing apparatus including the at least one memory and the at least one processor therein.

11. The charging processing system according to claim 1, further comprising:
    an information processing apparatus, the information processing apparatus including a first memory of the at least one memory and a first processor of the at least one processor therein, and
    the first device, the first device including a second memory of the at least one memory and a second processor of the at least one processor therein, the second processor configured to execute the first function.

12. A method of charging for execution of a first function on a first device to assist a second device, the method comprising:
    receiving, from the second device, a request to execute the first function, the first function being executable at the first device and non-executable at the second device;
    executing the first function at the first device and provide results of same to the second device such that the second device cooperates with the first device to execute the first function; and
    automatically determining an amount of charge for execution of the first function in response to a difference between a performance with regard to the first function and one of (i) a performance of the second device and (ii) a performance with regard to a second function, the second function being a function having a lower performance than the first function and non-executable at the second device such that the method determines the amount of charge attributable to the second device for cooperative execution of the first function by the first device on behalf of the second device that is unable to execute the first function, where the amount of charge attributed to the second device for the cooperative execution of the first function varies based on one of (i) the performance of the second device, which is unable to executable the first function, and (ii) the performance of a function having lower performance than the first function and also available to the second device only through the cooperative execution with the first device.

13. A non-transitory recording medium including instructions that, when executed by at least one processor, configure the processor to,
    receive, from a second device, a request to execute a first function, the first function being executable at a first device and non-executable at the second device;
    execute the first function at the first device and provide results of same to the second device such that the second device cooperates with the first device to execute the first function; and
    automatically determining an amount of charge for execution of the first function in response to a difference between a performance with regard to the first function and one of (i) a performance of the second device and (ii) a performance with regard to a second function, the second function being a function having a lower performance than the first function and non-executable at the second device such that the processor determines the amount of charge attributable to the second device for cooperative execution of the first function by the first device on behalf of the second device that is unable to execute the first function, where the amount of charge attributed to the second device for the cooperative execution of the first function varies based on one of (i) the performance of the second device, which is unable to executable the first function, and (ii) the performance of a function having lower performance than the first function and also available to the second device only through the cooperative execution with the first device.

\* \* \* \* \*